E. Peck.
Harvester Dropper.

N° 27151      Patented Feb. 14, 1860.

Witnesses.
J. B. Manny
D. J. Porter

Inventor.
Edmond Peck

UNITED STATES PATENT OFFICE.

E. PECK, OF SAN JOSÉ, CALIFORNIA.

IMPROVEMENT IN HARVESTERS.

Specification forming part of Letters Patent No. 27,151, dated February 14, 1860.

*To all whom it may concern:*

Be it known that I, E. PECK, of San José, in the county of Santa Clara and State of California, have invented certain new and useful Improvements in Harvesting-Machines; and I do hereby declare that the following is a full, clear, and exact description of the same, reference being had to the annexed drawings, making a part of this specification, in which—

Figure 1:
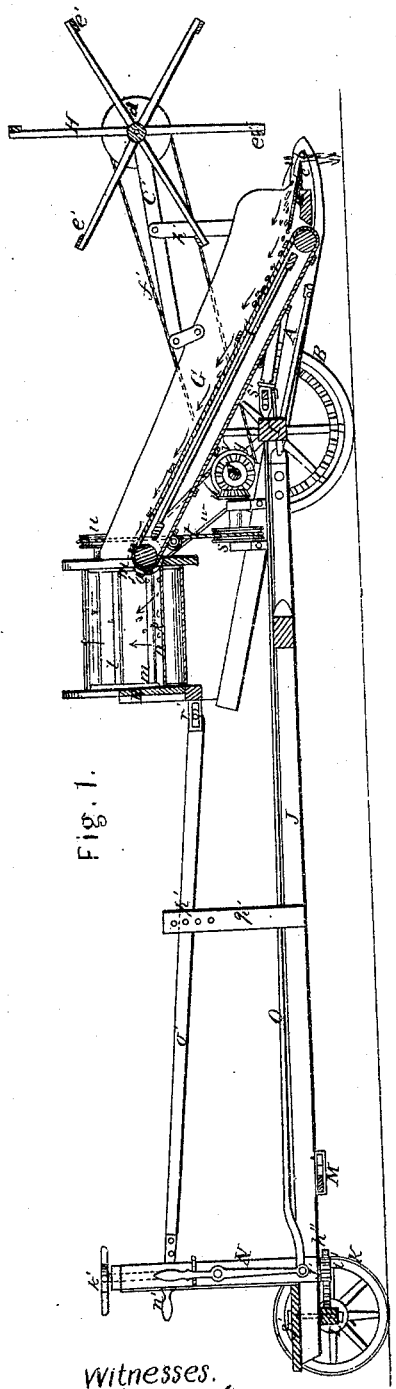
Figure 3:
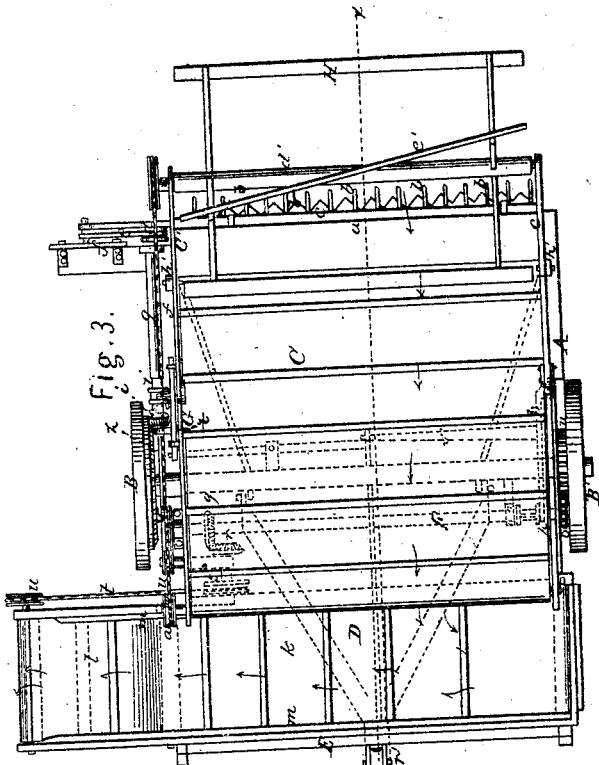
Figure 2:
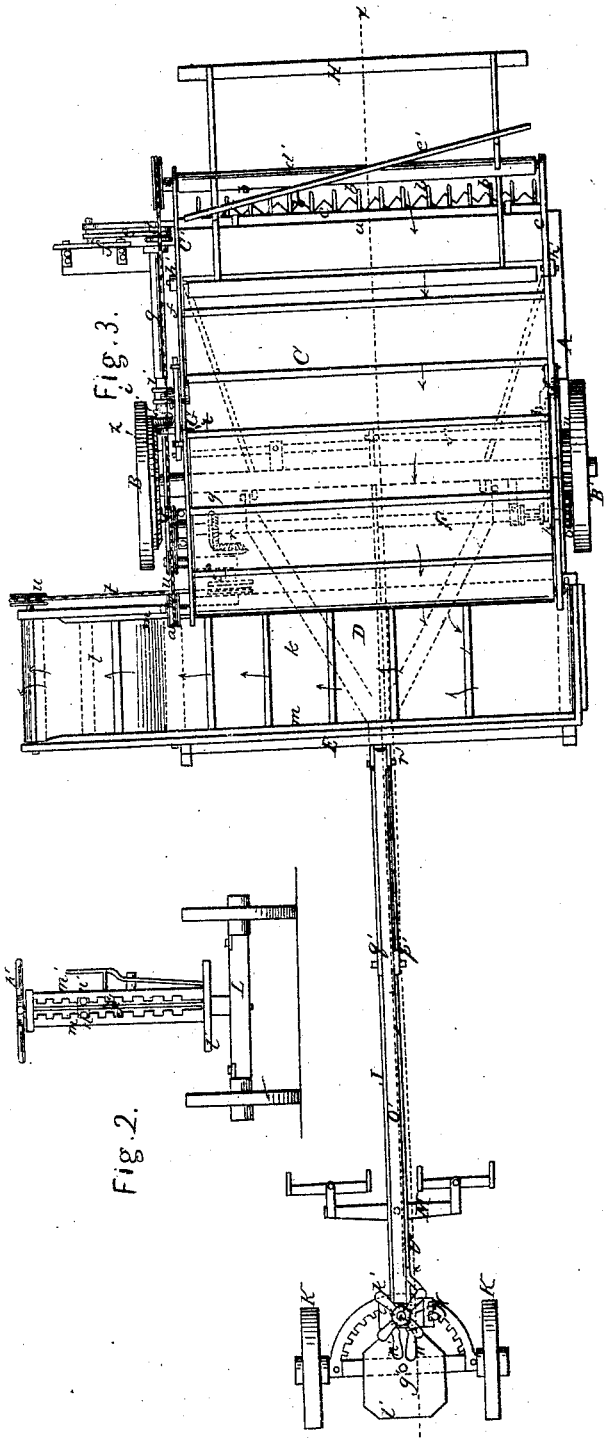

Figure 1 is a side sectional view of my invention, taken in the line $x\ x$, Fig. 3. Fig. 2 is a detached back view of the back wheels of the machine with the racks and driver's stand attached. Fig. 3 is a plan or top view of the whole machine.

Similar letters of reference indicate corresponding parts in the several figures.

To enable others skilled in the art to fully understand and construct my invention, I will proceed to describe it.

A represents a rectangular frame, which is mounted on two wheels, B B'. To the front end of this frame A a finger-bar, $a$, is attached, said bar being provided with fingers $b$, as usual, in which a reciprocating sickle, $c$, works, the sickle having saw-shaped teeth and being operated by a crank, $d$, connecting-rod $e$, attached to a slide, $f$, to which the end of the sickle is connected. (See Fig. 3.) The shaft $g$ of the crank $d$ receives its motion from the traction-wheel B through the medium of gearing $h\ i$, the gear-wheel $h$ being permanently attached to the wheel B, and the pinion $i$ placed loosely on the shaft $g$, and connected with it, when desired, by a clutch, $j$, plainly shown in Fig. 3.

On the frame A an inclined endless apron, C, is placed. This apron may be made of any suitable textile fabric, and it extends from the back part of the finger-bar $a$ nearly to the back end of the frame A, sufficient space being allowed for a transverse endless apron, D, which has a horizontal and an inclined portion. The horizontal portion $k$ extends the width of the frame A, and the inclined portion $l$ projects beyond the side of the frame A at its back part. The apron D is made to work in the desired form by having its edges fitted beneath ledges $m$, attached to the inner side of the apron-box E. The back part of the apron C projects over the front side of the apron D, as shown in Fig. 1. The endless aprons C and D move in the direction indicated by the red arrows. The aprons are both operated from the traction-wheel B' by the following means. To the wheel B' a toothed wheel, $n$, is attached. The wheel $n$ gears into a pinion, $o$, which is placed loosely on a shaft, F, said shaft being placed transversely in the frame A below the apron C. The pinion $o$ is connected with the shaft F, when desired, by a clutch, $p$, shown by dotted lines in Fig. 3. On one end of the shaft F a bevel-wheel, $q$, is placed, and this wheel gears into a corresponding wheel, $r$, on the shaft of which a pulley, $s$, is placed. Around the pulley $r$ a belt, $t$, passes, said belt also passing around a pulley, $u$, on one end of the upper roller of the inclined portion $l$ of the apron D. (See Figs. 1 and 3.) On one end of the shaft F a pulley, $v$, is placed, said pulley having a belt, $w$, passing around it, which belt also passes around a pulley, $a'$, on the upper roller of the apron C. (See Figs. 1 and 3.)

On the front part of the frame A there are two uprights, $h'\ h'$, one at each side. These uprights are perforated and support at different heights, as may be desired, inclined bars $c'\ c'$, the back ends of which are connected by joints to the box G of the apron C, the bars being supported by pins passing through either of the perforations of the uprights $h'\ h'$. Between the outer ends of the bars $c'\ c'$ the shaft $d'$ of the reel H is placed and allowed to rotate freely. The reel H is provided with curved or spiral beaters $e'$, and as the reel rotates the beaters pass just above the sickle $c$ and fingers $b$. The reel H is driven by a belt, $f'$, from the pulley $v$ on shaft F, said pulley having a double groove.

To the axle I of the wheels B B' the front end of a horizontal bar or perch, J, is attached by joints, the front end of said bar or perch being forked, as shown clearly by the dotted lines in Fig. 3. The bar or perch J extends some distance back of the frame A, and the back end of the perch is supported by two wheels, K K, the whole being secured by a king-bolt, $g'$, to the axle L of said wheels.

To the axle L a semicircular rack, $h''$, is attached, and a pinion, $i'$, gears into said rack. The pinion $i'$ is at the lower end of a vertical rod or shaft, $j'$, which has levers or hand-wheel $k'$ on its upper end. To the back end of the perch J a driver's stand or platform, $l'$, is attached.

To the back part of the perch J two vertical racks, $m'$ $m'$, are attached, between which the rod or shaft $j'$ is fitted, and also two spring-plates, $n'$ $n'$, which are attached to the back end of a lever, $o'$. The lever $o'$ has its fulcrum-pin $p'$ passing through an upright, $q'$, on the perch J, and the front end of said lever is attached by a joint, $r'$, to the back part of the frame A.

To the back part of the perch J a double-tree, M, is attached. The team is attached thereto, as usual. N is a lever which is attached to one of the racks $m'$, and a rod, O, is connected to the lower end of the lever N. The rod O extends along by the side of the perch J, and its front end is attached to two levers, $s'$ $s'$, which are connected with the rods $t$ of the clutches $j$ $p$.

The operation is as follows: As the machine is shoved or propelled along by the team, which is behind the frame A, the heads of the grain are cut by the sickle $c$, operated by the means hereinbefore described, the beaters $e'$ of the reel forcing the heads against the teeth of the sickle. The heads of grain are carried up by the apron C and deposited on the apron D, the latter conveying them into a wagon-body which is drawn along by the side of the machine, and underneath the inclined portion $l$ of the apron D. The sickle $c$ and finger-bar $a$ are raised and lowered so as to suit the height of the standing grain by adjusting the lever $o'$, the spring-plates $n'$ $n'$ retaining the lever $o'$ in the desired position, in consequence of catching into the racks $m'$ $m'$. The aprons C D and also the driving device of the sickle $c$ may be thrown in and out of gear simultaneously by actuating the clutches $j$ $p$ through the medium of the lever N. The machine is turned and guided by means of the rod or shaft $j'$, pinion $i'$, and semicircular rack $h'$, arranged as shown. As the driver stands on the platform $l$ the spring-plates $n'$ $n'$ of the lever $o'$ and the lever N are within his reach, and may be operated or adjusted with facility.

I do not claim placing the team behind the sickle or cutting-device, for this has been previously done. Neither do I claim broadly guiding the machine by having the axles of the back wheels arranged to turn on a king-bolt or pivot, for this has also been done; but,

Having thus described my invention, what I do claim as new, and desire to secure by Letters Patent, is—

The arrangement of the vertical rod $j'$, racks $m'$ $m'$, lever N, spring-plates $n'$ $n'$, rods O $o'$, perch J, apron-box E, axle I, and clutches $j$ $p$, as and for the purposes herein shown and described.

EDMOND PECK.

Witnesses:
I. B. MANNY,
D. J. PORTER.